(No Model.)
S. F. MOUCK.
WATER ELEVATOR.
No. 552,855. Patented Jan. 7, 1896.
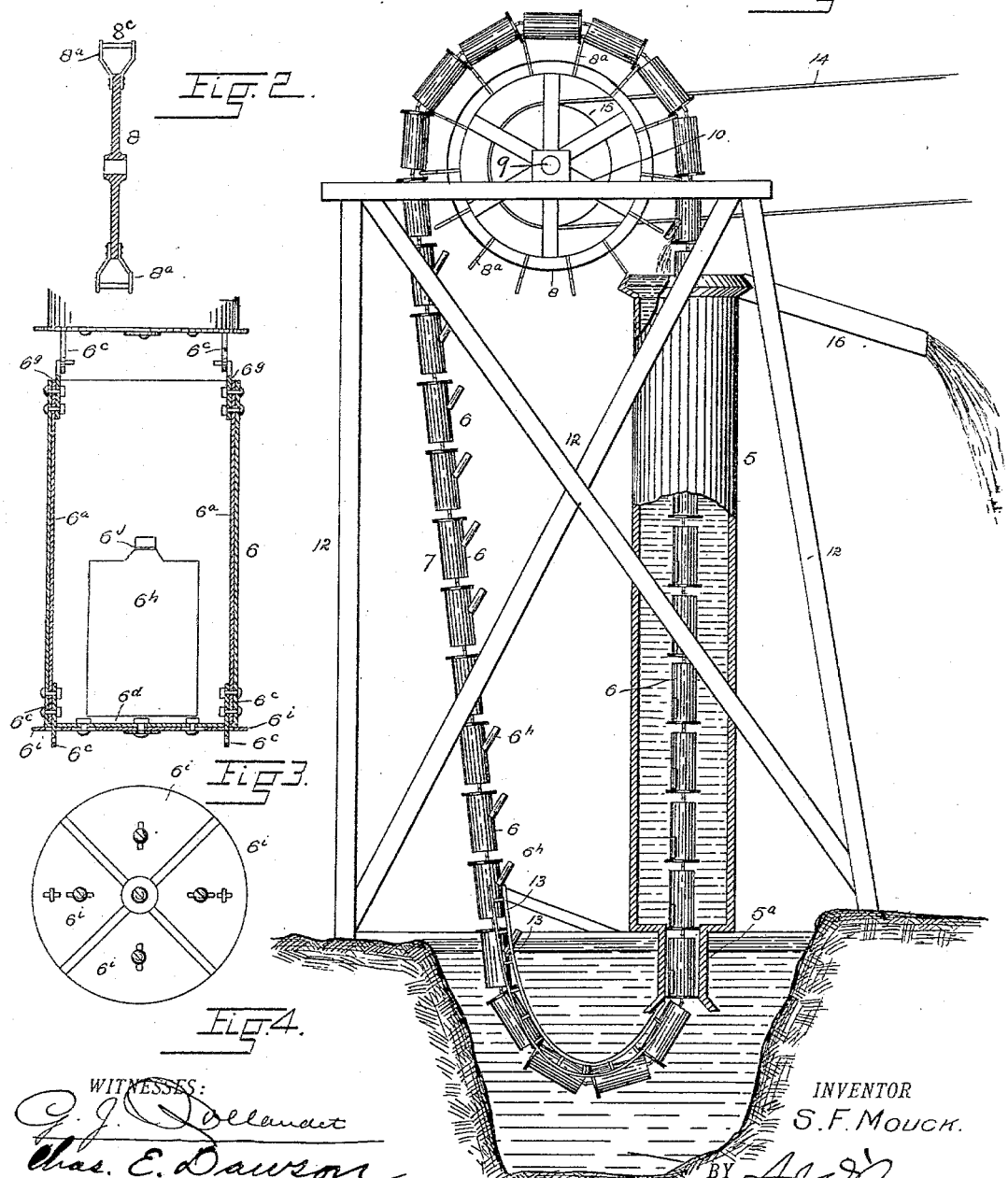

UNITED STATES PATENT OFFICE.

SOLOMON F. MOUCK, OF DENVER, COLORADO.

WATER-ELEVATOR.

SPECIFICATION forming part of Letters Patent No. 552,855, dated January 7, 1896.

Application filed May 11, 1894. Serial No. 510,875. (No model.)

*To all whom it may concern:*

Be it known that I, SOLOMON F. MOUCK, a citizen of the United States of America, residing at Denver, in the county of Arapahoe and State of Colorado, have invented certain new and useful Improvements in Water-Elevators; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in water-elevators; and my object is to provide an economical means for the raising of water for irrigating and other purposes.

The chief feature of the invention consists of an upright column of water inclosed by a suitable casing of any desired height, depending upon the height to which it is necessary to raise the water. The casing which supports this column of water has an opening at the bottom surrounded by a depending tube which projects into the natural stream or body of water forming the source of supply. An endless chain or belt composed of parts adapted to fill this opening in the bottom of the casing is supported in such a manner that it dips into the natural body of water, extends through the opening in the bottom of the casing, and passes up through the column of water and over a wheel mounted on a shaft, to which any power may be applied for operating the elevator. The object of the endless chain is to carry water from the source of supply up into the casing, and at the same time prevent the water already in the casing from escaping. This chain is preferably composed of buckets of such construction as to carry water into the upright casing to the best advantage. As the water is drawn into the bottom of the casing it overflows at the top. The column of water thus becomes the means of elevating the water from the source of supply to the top of the column. Assuming that the casing is full, there will be an overflow at the top as the water is drawn into the casing through the medium of the endless chain. The volume of this overflow will be measured by the amount of water taken from the natural source by the bucket-chain. However, without going into details, it may be said that an important advantage is obtained by the interposition of the column of water between the source of supply and the plane to which the water is to be raised.

The invention will be fully understood by reference to the accompanying drawings, in which is illustrated an embodiment thereof.

In the drawings, Figure 1 is a side elevation of the mechanism, partly in section. Fig. 2 is an edge view of the wheel in detail. Fig. 3 is a longitudinal section of one of the buckets. Fig. 4 is a bottom or underneath view of the same.

Similar reference-characters indicate corresponding parts or elements of the mechanism in the several views.

Let the numeral 5 designate an upright casing of any suitable height, and of any desired area in cross-section. The casing is supported close to the surface of the water in the canal, natural stream, or other source of supply. An aperture in the bottom of this casing is surrounded by a depending tube $5^a$ projecting into the water of the supply source, and enlarged at its free extremity to facilitate the entrance of the buckets 6, composing the endless chain 7 which is supported upon a wheel 8, whose axle 9 is journaled in a suitable platform 10 supported upon a frame 12 erected in proximity to the water-supply source.

The bucket-chain is guided, as it passes downward into the stream, by bent rods 13 suitably supported. The buckets 6 are all alike, and the description of one will be sufficient. Though I prefer to employ the construction of bucket shown in the drawings, I do not limit myself to its use, since I am aware that other constructions may be employed without departing from the spirit of the invention. As shown in the drawings, the body of the bucket is composed of sheet metal having metal straps $6^a$ applied lengthwise to its inner surface on two diametrically-opposite sides. Those straps give the bucket sufficient strength and durability for the function it is required to perform. To the lower extremities of these straps are bolted arms $6^c$ which project through the bottom $6^d$ of the bucket, and are exteriorly apertured to receive the hooked arms 6g attached to the top of the adjoining bucket. These arms 6g are bolted to the opposite extremities of the metal straps.

The bucket is provided with a door 6h hinged at 6j. This door opens outward from the bottom of the bucket, and is an important feature. It allows the air to escape readily from the bucket as it enters the water, and it allows the water to escape as the bucket leaves the body of water in the stand-pipe. For instance, when the apparatus is first put in operation, the stand-pipe is empty. As the buckets enter the empty stand-pipe, they immediately discharge their contents thereinto until the pipe is full, and afterward the water cannot be lifted by the buckets above the top of the pipe, since as the buckets leave the water the doors open, their contents escape, and the empty buckets pass over the wheel at the top of the frame. The bottom of the bucket is provided with a false bottom, composed of movable segments 6i which are held fast by set-screws passed through slots formed in the segments and into the true bottom of the bucket. By moving these segments outward, the circumference of the bucket bottom is increased. Hence by this construction the bucket bottom may be made to fill the tube 5a in case the bucket, by reason of wear, may be found too small to fill the tube.

From the foregoing description the operation of the mechanism will be readily understood.

Power is applied by means of a belt 14 leading from any suitable motor, and passing around a pulley 15 on the shaft 9. The spokes of the wheel are forked, as shown at 8a, and provided with pins 8c, which pass through the arms of the forks and engage the projecting bucket-arms 6c between the buckets as the chain moves over the wheel. The buckets, in moving downward, pass beneath the surface of the water in the canal or stream. As the buckets enter the water source, they are in an inverted position, and therefore, when they pass upward and enter the tube 5a, they assume an upright position, and, being full, are carried up into the casing 5. These buckets act as pistons while passing through the tube, and allow no water to pass downward out of the casing, since one bucket enters the tube before another leaves the same. As the volume of water in the casing is augmented by the incoming buckets, it overflows at the top into a spout or chute 16, whence it may be carried by means of a suitable conduit to any desired distance. As the buckets leave the water at the top of the casing the doors 6h open and allow the contents of the buckets to escape. Hence the buckets carry no water out of the casing.

It will be observed that the false bottom composed of the segmental sections 6i is the only portion of the bucket which engages the tube 5a. The body of the bucket is somewhat smaller than the tube and may pass freely therethrough without friction. As the projecting circumferential rim formed of the segments 6i becomes worn, the segments are moved outward to compensate for such wear. A thin sheet of water thus surrounds the bucket while in the tube and rests upon the rim of the false bottom.

Having thus described my invention, what I claim is—

1. In a water elevator, the combination of a stand-pipe having an opening in the bottom and a tubular mouth surrounding this opening, an endless chain of buckets hinged together and having hinged doors adapted to cover openings extending to the bottoms of the buckets, said doors being free to open outward, and suitable means for supporting and propelling the bucket-chain, substantially as described.

2. In a water elevator, the combination of a stand-pipe having an opening in the bottom, and a tubular mouth surrounding the opening, an endless chain of buckets hinged together, each bucket having a hinged door adapted to cover an opening extending to the bottom of the bucket, said door being adapted to open outwardly, guide rods attached to the tubular mouth of the stand-pipe at one extremity, and to the framework at the opposite extremity, and suitable means for supporting and propelling the buckets, substantially as described.

3. In a water elevator, the combination of a stand-pipe having an opening in the bottom, and a tubular mouth surrounding this opening, an endless chain of buckets hinged together as closely as practicable, and having narrow rims projecting from their bottoms to engagement with the wall of the mouth attached to the bottom of the stand-pipe, the buckets being provided with doors which are free to open outward from the bucket bottoms when relieved from resisting pressure, and suitable means for supporting and propelling the buckets, substantially as described.

In testimony whereof I affix my signature in the presence of two witnesses.

SOLOMON F. MOUCK.

Witnesses:
A. J. O'BRIEN,
CHAS. E. DAWSON.